United States Patent

[11] 3,588,660

[72] Inventor Rawlins E. Purkhiser
 Springfield, N.J.
[21] Appl. No. 587,003
[22] Filed Oct. 17, 1966
[45] Patented June 28, 1971
[73] Assignee Air Reduction Company, Incorporated
 New York, N.Y.

[54] MASTER-SLAVE PLURAL MOTOR POSITIONING CONTROL
 6 Claims, 10 Drawing Figs.

[52] U.S. Cl. .................................................. 318/658,
 318/625, 219/125, 219/109
[51] Int. Cl. ............................................................ G05b 1/06,
 B23k 9/12
[50] Field of Search............................................ 219/109,
 125; 318/20.720 (UX)

[56] References Cited
UNITED STATES PATENTS
| | | | |
|---|---|---|---|
| 3,480,756 | 11/1969 | Sullivan......................... | 219/125 |
| 1,975,997 | 10/1934 | Whitesell, Jr.................. | 219/109 |
| 3,068,386 | 12/1962 | Jaeger et al................ | 318/(20.720)UX |

*Primary Examiner*—T. E. Lynch
*Attorneys*—Edmund W. Bopp and H. Hume Mathews

ABSTRACT: A synchronizing system for welding both sides of a magnetic plate including a master motor driven carriage moving along one side of the plate and carrying an AC magnetic field generator which is E-shaped, a slave motor driven carriage to be moved in synchronism on the opposite side of the plate and carrying an armature which unbalances the magnetic field if the carriages are out of synchronism, the E-shaped generator including secondary windings sensing the unbalance, and motor control means controlling the slave motor accordingly.

INVENTOR
RAWLINS E. PURKHISER

INVENTOR
RAWLINS E. PURKHISER
BY *Edmund W. Bopp*
AGENT

INVENTOR
RAWLINS E. PURKHISER
BY
Edmund W. Bopp
AGENT

INVENTOR
RAWLINS E. PURKHISER
BY
Edmund W. Bopp
AGENT

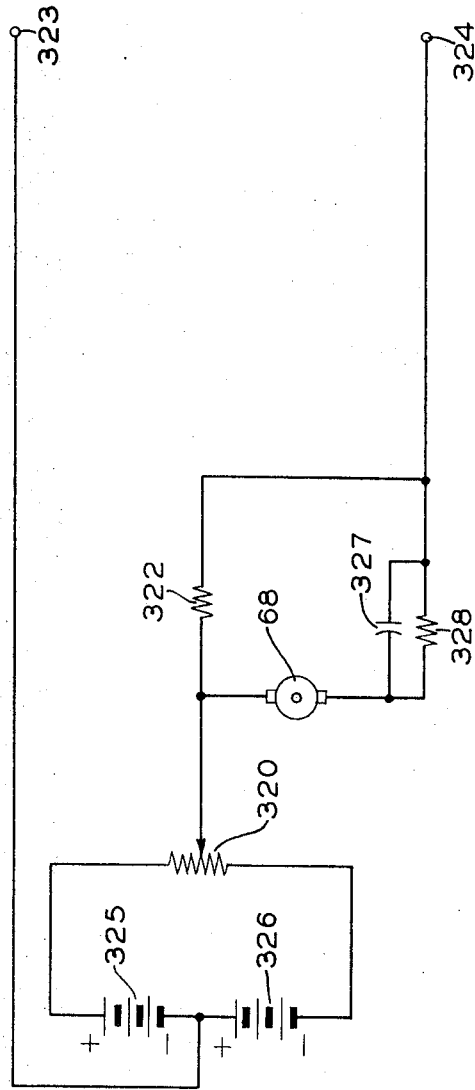

MASTER-SLAVE PLURAL MOTOR POSITIONING CONTROL

This invention relates to a device for moving a pair of tools on opposite sides of a workpiece so as to maintain a desired substantially fixed relative position of the tools, and more particularly under circumstances wherein mechanical interconnection of the tools is not practical as for example, where the respective tools are one inside and the other outside of a container or tank which is under construction.

The invention will be described in conjunction with a pair of welding machines designed to apply welding electrodes opposite each other along a seam between metal plates, although it is to be understood that the invention is not limited to this particular use.

A typical situation in which mechanical linking of the welding electrodes on the two sides of the plates is not practical, is in the fabrication of a cylindrical tank from curved plates where the plates may be quite wide, for example 10 feet or more in width, in which case the mechanical linkage would be required to extend from the bottom of the plate up and over the top and back down to the bottom on the other side of the plate, a distance of at least 20 feet.

An object of the invention is to move tools in synchronism on opposite sides of a workpiece under conditions wherein a mechanical linkage between the tools is out of the question or is for any reason not feasible.

A related object is to maintain the relative position of the tools constant while both tools are in motion.

A feature of the invention is the use of an E-transformer having a core and windings mounted upon a common carriage with one of the tools to be synchronized and having an armature mounted upon another common carriage with the other of the tools.

A related feature is that the only controlling connection of any kind between the apparatus on the two sides of the workpiece is by way of a magnetic field which is generated by apparatus on one side of the workpiece for projection and extension through the material of the workpiece and is modified in its field pattern by a change in relative position of the apparatus on the two sides, which modification is sensed by apparatus located on one side only of the workpiece, preferably the side where the field is generated.

Another feature is a servosystem especially adapted for controlling the speed and direction of rotation of an electric motor in response to a manually selected command signal or to sensed variations in an automatic control system, for example in response to sensed modifications in a magnetic field pattern.

Another feature is an improved speed and direction control for a direct current motor, continuously variable through zero speed to full speed in either direction, without the use of any make-and-break contactors.

Another feature is the adaptation of the said improved motor control system as either a position servo or a velocity servo.

In accordance with one embodiment of the invention, any modification in the magnetic field pattern is translated into a change in the relative strength of two opposed alternating currents. The currents are separately rectified and applied to a balanced direct current amplifier circuit to unbalance the outputs therefrom. These unbalanced outputs are used to control a pair of variable phase shifters each of which employs a saturable reactor. Each said phase shifter controls the current passed by a respective one of two variable impedance devices that are each unidirectionally conductive to control currents in opposite directions relative to a motor element. Depending upon the direction of motion of the tools to be synchronized, one or the other of the said variable impedance devices is shut off, while the other is caused to pass a suitable current in accordance with the need to speed up or slow down the motor. One of the tools is moved by a master motor and the other by a slave motor, the latter controlled by the servosystem above described. Damping of the servosystem is provided to reduce the adverse effects of hunting.

In this embodiment, the motor control system performs a position servo function, actuated by sensed changes in an alternating current, which current is rectified before it is impressed upon the motor control system. The motor control system, however, is so arranged that it responds to direct current inputs, whether or not these inputs are obtained by rectifying an alternating current.

In another embodiment, the motor control system is used in a velocity servo system.

Other features, objects and advantages will appear from the following more detailed description of illustrative embodiments of the invention, which will now be given in conjunction with the accompanying drawings.

In the drawings,

FIGS. 1 and 2, when placed with FIG. 2 above FIG. 1, together constitute a combined mechanical and electrical schematic diagram of a tool moving and servocontrol system in accordance with the invention;

Figure 1:
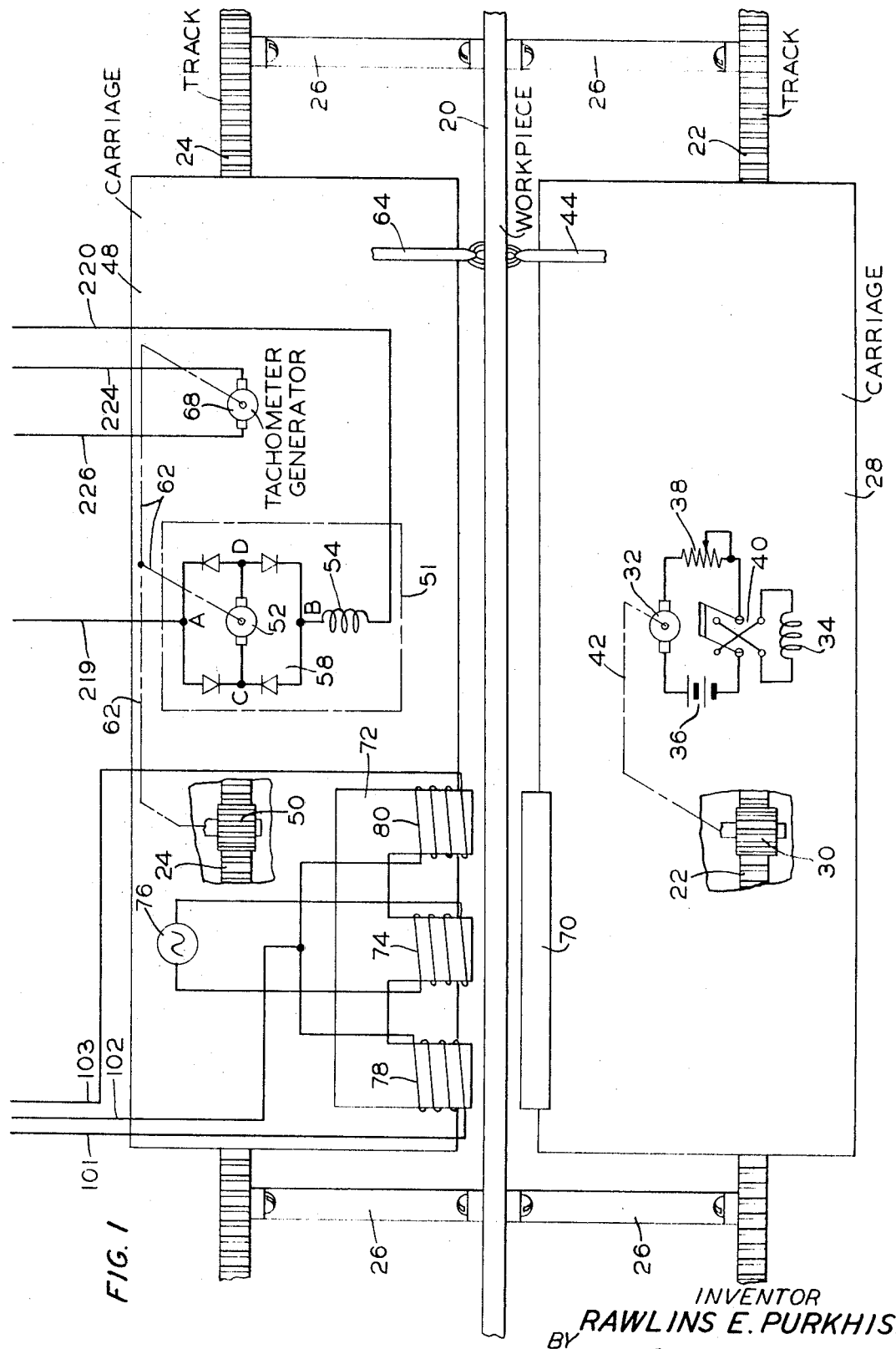
Figure 2:
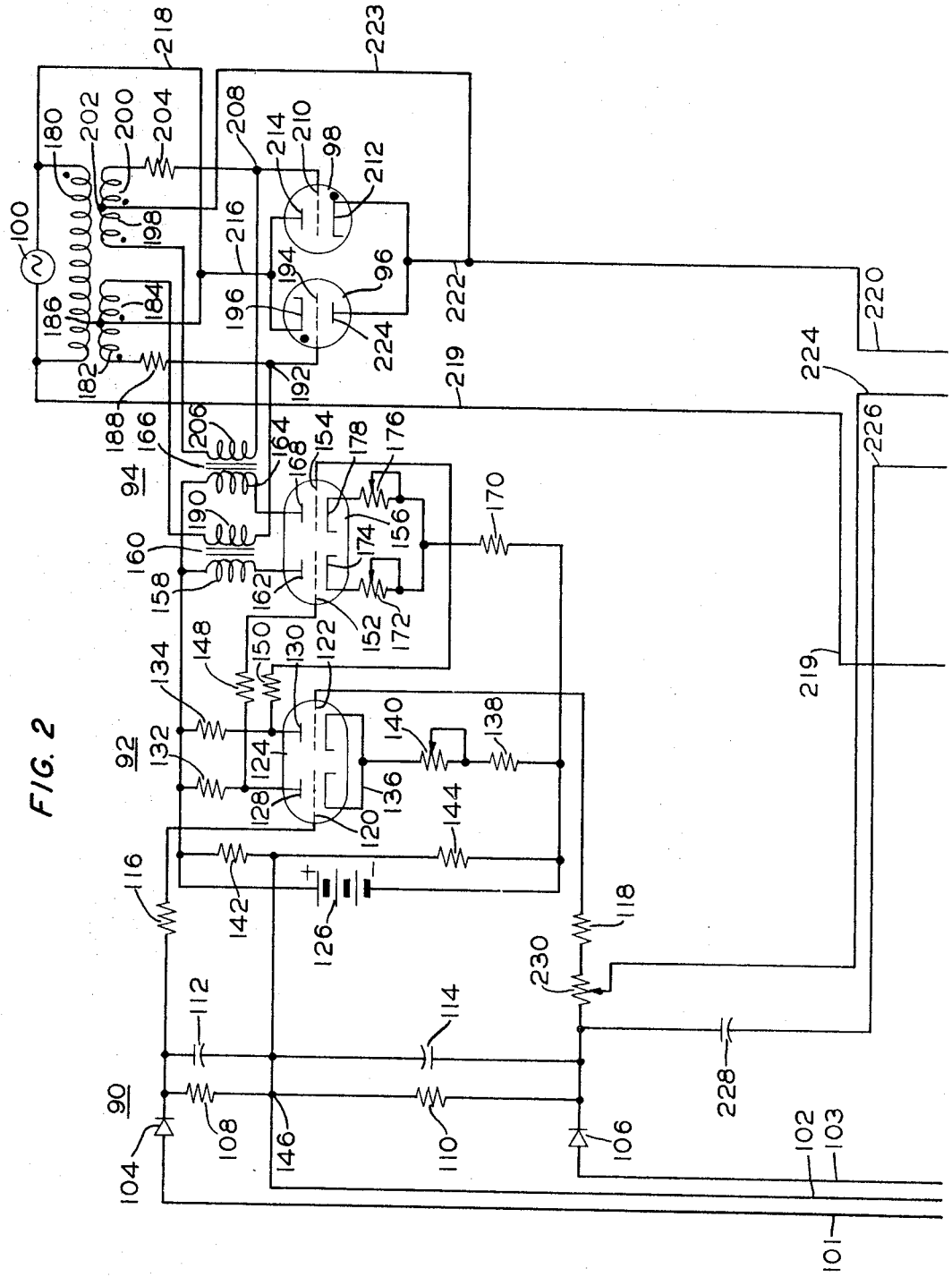
Figure 8:
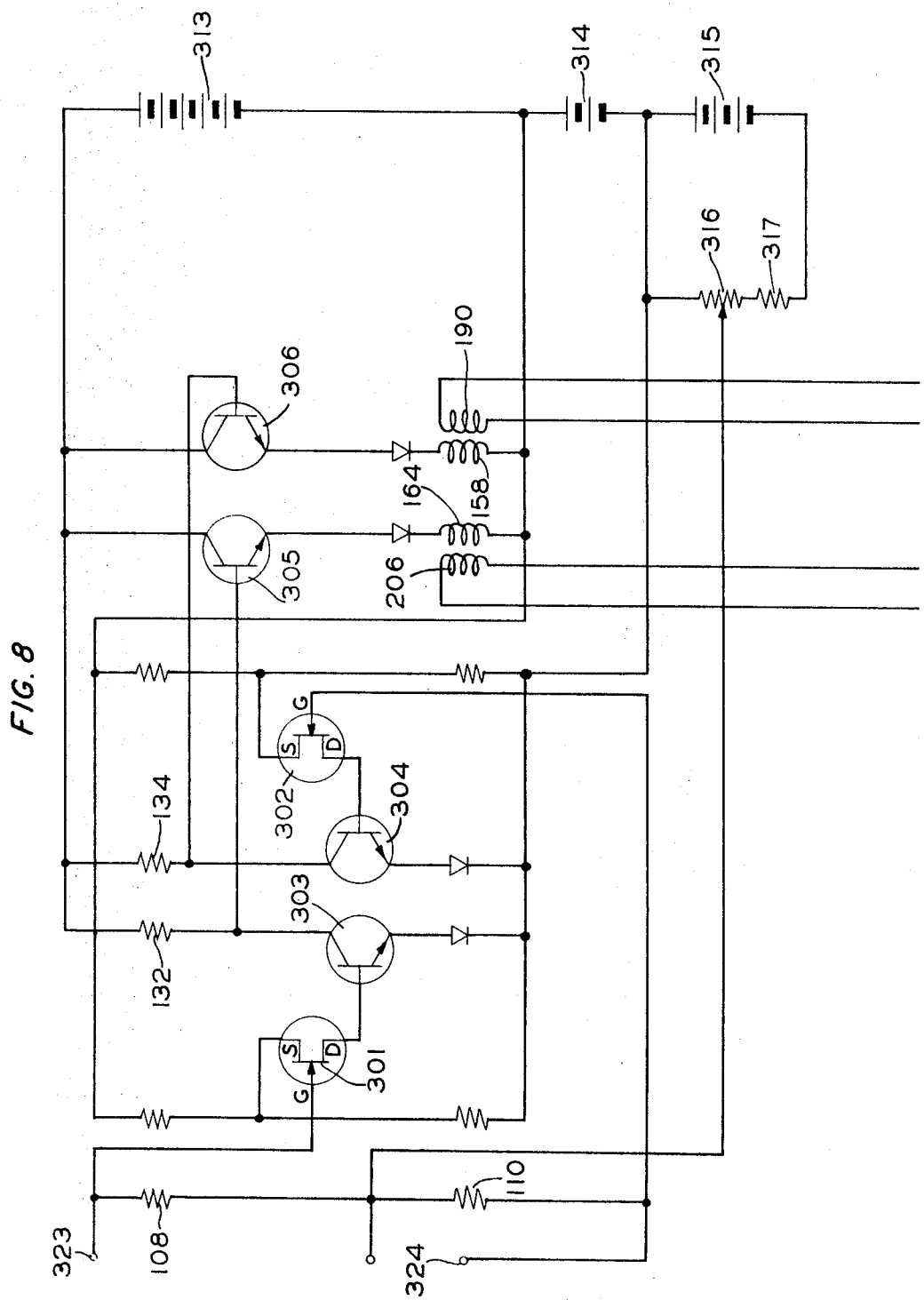
Figure 9:
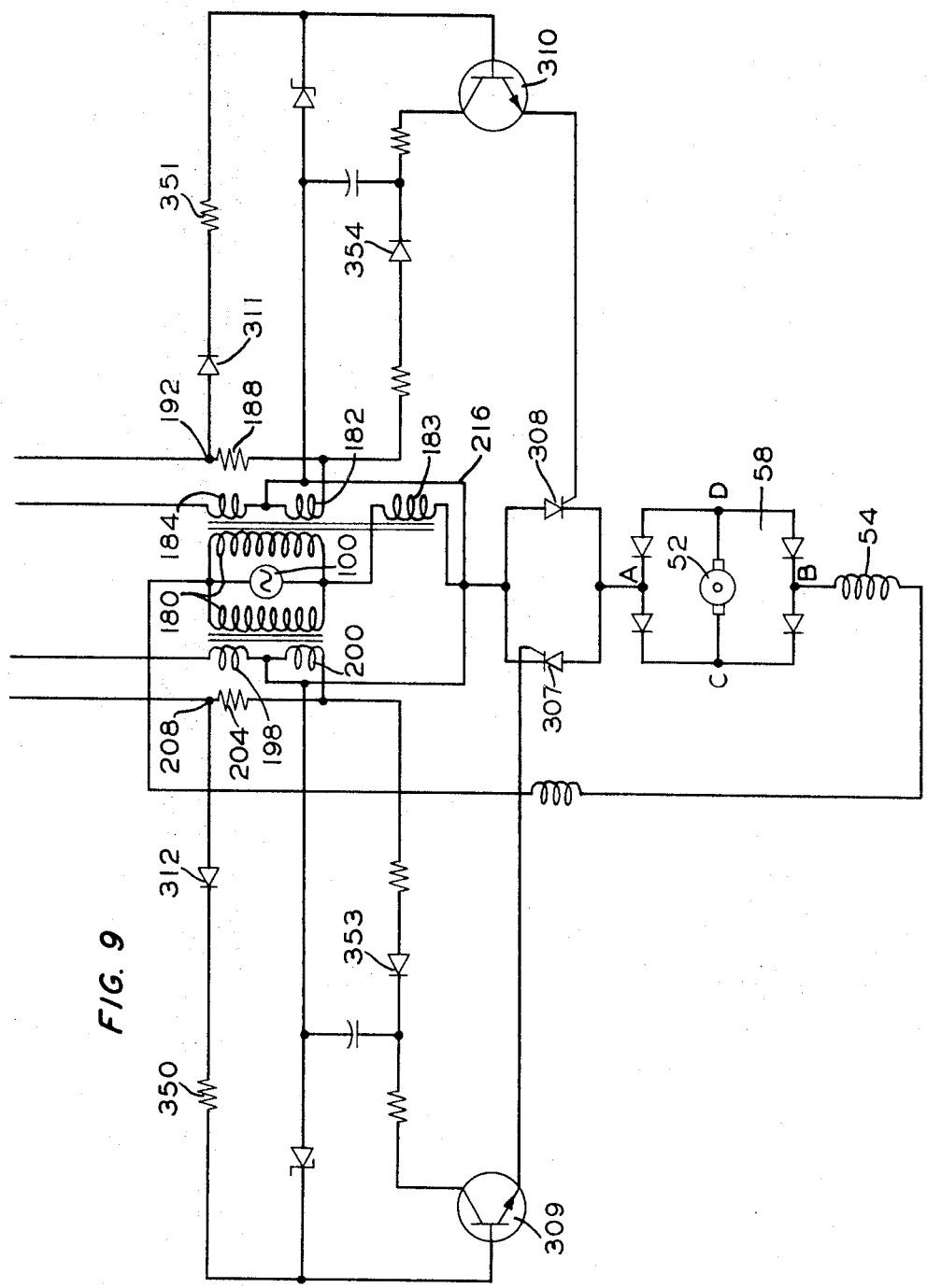

FIGS. 8 and 9 taken together, constitute a schematic circuit diagram of motor controls in accordance with the invention, using solid state components in place of thermionic tubes as shown in FIGS. 1 and 2, FIG. 10 shows an input circuit for the motor controls shown in FIGS. 8 and 9 for utilizing the motor controls in a velocity servosystem; and FIG. 11 shows how FIGS. 8, 9 and 10 are to be arranged to form together a complete schematic diagram of a servosystem.

Referring to FIG. 1, there is shown in plan view a workpiece 20 in the form of a vertical plate preferably of material of little or no magnetic permeability, for example, of aluminum, copper, etc. On each side of the workpiece there are mounted tracks 22 and 24, respectively, which may be in the form of rack gearing attached to the plate 20 by suitable means, preferably readily demountable, such as spacers 26. Geared to each rack is a carriage, illustrated as a welding skate, of which carriage 28 has mounted thereon a pinion gear 30 that meshes with the rack 22 and is arranged to be driven by an electric motor having an armature 32 and a field winding 34, driven by any suitable source, such as a source of regulated direct current, illustrated as a battery 36. The motor is adjustable as to speed by means of a rheostat 38, is reversible as to direction of rotation by means of a reversing switch 40, and, being independently controllable, may be called a master motor. The mechanical connection between the armature 32 and the pinion 30 is shown schematically by broken lines at 42. By means of the motor and gearing, the carriage 28 may be driven along the track 22 in either direction at any suitable preferably substantially constant speed. Attached to and carried by the carriage 28 is a tool 44 for operating along a face of the workpiece 20, the tool being illustrated as a welding electrode.

The other carriage 48 has mounted thereon a pinion gear 50 that meshes with the rack 24 and is arranged to be driven by an electric motor having an armature 52 and a series field winding 54, driven by a suitable alternating current source, illustrated schematically at 100 (FIG. 2), through a rectifier bridge 58, and controllable as to speed and direction of rotation as a slave motor by means shown in FIGS. 1 and 2. Mechanical driving connections between the armature 52, the pinion 50 and a tachometer generator 68 are shown schematically by broken lines 62. Attached to and carried by the carriage 48 is a second tool 64 for operating along the other face of the workpiece 20 in the case of welding, usually directly opposite the tool 44, although if desired, the tools 44 and 64 may be arbitrarily positioned upon the respective carriages to cooperate in any desired manner.

Figure 5:
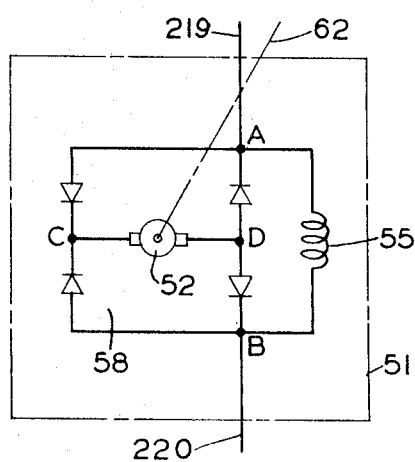
FIG. 5 is a fragmentary schematic diagram showing how a part of FIG. 1 may be modified to substitute a shunt wound motor for a series wound motor.

The field winding for the motor armature 52 may be a shunt field winding 55 instead of the series field winding 54 shown in FIG. 1. In this case, the connections are as shown in FIG. 5, which is to be substituted for the part of FIG. 1 enclosed by a dot-dash line 51. In the circuit of FIG. 5, the series field winding 54 is omitted and, instead, the shunt field winding 55 is connected in shunt relationship to the bridge 58.

It will be noted that the bridge 58 constitutes a full-wave rectifier circuit having a pair of alternating current input terminals A and B as indicated in the figures, and a pair of direct current output terminals C and D. Whichever motor element armature or field winding, is placed between the terminals C and D receives current in one and the same direction only, while the other motor element receives current in either direction under the control of a pair of thyratrons 96, 98. Accordingly, the current in one motor element can be reversed without at the same time reversing the current in the other motor element, thereby providing an advantageous means for reversing the direction of rotation of the motor under the control of a direct current of controllable amplitude and polarity and without the use of any make-and-break contactor.

It may be noted that the master rotor may be mounted upon the carriage 48 with the rotor 32 driving the pinion 50, if desired, instead of driving pinion 30 as shown. In such case, the slave motor will be mounted upon the carriage 28 with the rotor 52 driving the pinion 30. However, this variation will usually be less desirable than the arrangement illustrated, because electrical connections from one side of the workpiece to the other are necessitated, which are an undesirable complication.

Mounted upon the carriage 28, preferably in close proximity to and parallel with the workpiece 20 is the armature 70 of an E-transformer, so called because it has an E-shaped core as shown at 72. The core 72 is mounted upon the carriage 48, also preferably in close proximity to the workpiece 20. When the tools 44 and 64 respectively are in their desired relative positions, the armature 70 and core 72 are to be approximately directly opposite each other as shown, with the end faces of the E-core parallel to the armature 70. The center arm of the E-core is provided with a winding 74 which is preferably the exciting or primary winding, energized by a suitable source of alternating current shown schematically at 76. The outer arms of the E-core are provided with sensing or secondary windings 78 and 80 respectively, which are wound in series opposing relationship with respect to the magnetic flux produced in the core by the winding 74 and source 76.

Referring now to FIG. 2, there is shown a phase discriminator 90 connected to the sensing windings 78 and 80 (FIG. 1), a balanced direct current amplifier 92, a variable phase shifter 94, and the pair of thyratrons 96, 98, the latter pair excited by the alternating current source 100. Under suitable conditions the sources 76 and 100 may be one and the same.

Figure 3:
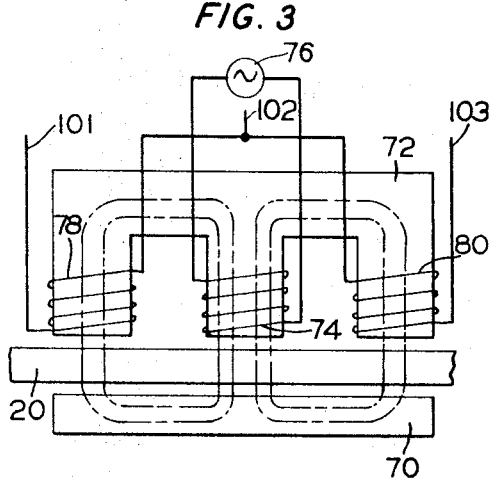
FIG. 3 is a schematic diagram showing an E-transformer with its armature centrally positioned to produce a symmetrical magnetic field pattern corresponding approximately to a desired relative position of tools on opposite sides of a workpiece.

FIG. 3 shows diagrammatically in broken lines the approximate pattern of magnetic flux in the E-transformer when the core 72 and armature 70 are symmetrically positioned with respect to each other. As shown in FIG. 3, the armature is in approximate spanning relation to the sensing windings 78 and 80, and has a constant cross section for uniform permeability. The flux produced by the alternating current from the source 76 is divided symmetrically between the outer arms of the core and induces substantially equal and opposite electromotive forces in the sensor windings 78 and 80, resulting in substantially an overall null response.

Figure 4:
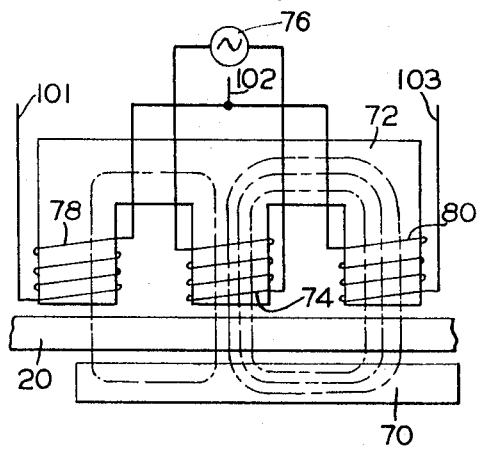
FIG. 4 is a similar schematic diagram showing the armature displaced to one side of the central position, producing an unsymmetrical magnetic field pattern.

FIG. 4 shows the effect of a lateral displacement of the armature 70 from the central position with respect to the core. As illustrated in the figure, it is assumed that the material of the armature 70 is ferromagnetic or paramagnetic, that is that the presence of the material increases the amount of magnetic flux with respect to the amount of flux which would flow were the material absent. For clarity in the diagram, the effect of the offcenter position of the armature 70 is somewhat exaggerated, showing materially more flux through sensor winding 80 than through sensor winding 78.

It will be evident that the workpiece forms a magnetic shunt to the armature 70. For that reason, if the workpiece is nonmagnetic or at least sufficiently like air or vacuum in its magnetic properties to offer minimum hindrance to the passage of the magnetic field through the workpiece into the armature 70, it will interfere least with the sensing action of the E-transformer. However, some shunting of magnetic flux through the workpiece may be tolerated without the device being rendered inoperative. It will be evident that if the armature 70 is displaced to the left of center, a ferromagnetic or paramagnetic armature will increase the flux through the winding 78 and decrease that through the winding 80.

If desired, the armature 70 may be made of diamagnetic material, in which case the presence of the armature reduces the amount of magnetic flux as compared with what would exist if the material were not present. The use of a diamagnetic armature in the configuration shown in FIG. 4 will modify the flux distribution pattern in such manner as to generate more flux through the winding 78 than through the winding 80.

In the broad aspects of the operation of the arrangement shown in FIGS. 1 and 2, let it first be assumed that the armature 70 and core 72 are initially unsymmetrically disposed in relative positions exemplified by FIG. 4. Suppose that the switch 40 is thrown into such closed position as to start up the motor armature 32 to move the carriage 28 to the right. The current through the winding 80 predominates over the current through the winding 78 and this predominance increases as the carriage 28 picks up speed, carrying the armature 70 still further to the right of the central position. The rectified current output of the phase discriminator 90 is impressed upon the grid electrodes of the direct current amplifier 92, unbalancing the plate currents of the two vacuum tubes constituting that amplifier, raising the anode potential of one tube and lowering the anode potential of the other tube. The respective anode potentials of the amplifier 92 are impressed upon two respective grid electrodes of the variable phase shifter 94, raising one grid potential and lowering the other. These grid electrodes are both biased to anode current cutoff, so that the grid which is lowered in potential maintains the anode current of that tube cut off. The tube that is cut off delivers no control current to the control winding of its associated saturable reactor, maintaining the reactor substantially unsaturated. The alternating current winding of the reactor then has maximum inductance. Due to this high inductance as the circuits are arranged, a particular one of the thyratrons 96, 98 is blocked by having its grid and anode remain substantially 180° out of phase with each other by alternating currents supplied by the source 100.

The raising of the grid potential in the other tube of the magnetic amplifier 94 permits a controlled amount of anode current to flow that that tube, and through the associated control winding, thus varying the amount of magnetic flux developed in the associated saturable reactor and in turn varying the inductance of the associated alternating current winding. Due to this variation of inductance, as the circuits are arranged, the other thyratron is unblocked and becomes conductive to a variable degree due to a varied phase relationship between its grid and anode voltages. The circuit is further arranged so that the thyratron current flows in the proper direction through the series field winding 54 (FIG. 1), or release through the shunt field winding 55 (FIG. 5) as the case may be, to turn the armature 52 in the proper direction to drive the carriage 48 to follow in the same direction in which the carriage 28 is moving. The phase relations in the system will be discussed in greater detail hereinafter.

The system comprising the amplifier 92, the amplifier 94, the active thyratron 96 or 98, and the alternating current source 100 may be designed to provide sufficient amplification and sufficient power to enable the carriage 48 to rapidly overtake the carriage 28. Equilibrium will occur when the displacement of the armature 70 to the right of the center of the E-core has become just sufficient to adjust the active thyratron to pass the amount of current required to drive the carriage 48 at substantially the same speed as the carriage 28 is being driven. As in all servomechanisms of this type, some hunting may occur due to overshooting the mark by the carriage 48 but this can be reduced to a negligible amount by damping, one example of which will be described below. After equilibrium is established, any subsequent relative displacement between the armature 70 and the core 72 will alter the response of the system in such manner as to either speed up or slow down the carriage 48 as required to maintain the relative positions of the armature and core substantially unchanging, the system functioning as a position servo. While the displacement between the armature and core will necessarily have to vary in order to permit the speed of the carriage 48 to vary, the amplification provided in the servo system may readily be made so great that this variation in displacement will be of negligible effect.

It will be evident that if the carriage 28 should initially move off to the left instead of to the right as assumed above, the magnetic flux through the sensor winding 80 will decrease and that through the sensor winding 78 will increase, with the result that the carriage 48 will be started up in the proper direction to pursue and overtake the carriage 28 in similar manner as in the example given above.

The overall result is that the tools 44 and 64 will be maintained substantially in fixed relative position as both carriages move along the workpiece. In the case of a welding machine, electrodes are enabled to weld directly opposite each other on opposite sides of the workpiece without any mechanical connection between apparatus on the two sides of the workpiece.

The circuits and operation of the arrangements shown in FIGS. 1 and 2 a a servosystem will now be described in greater detail. The alternating currents generated in the sensors 78 and 80 are transmitted over leads 101, 102 and 103 to rectifiers 104 and 106 with the result that the current in winding 78 gives rise to a potential difference across a resistor 108 and the current in winding 80 gives rise to a potential difference across a resistor 110. Ripples in the rectified currents are reduced by capacitors 112 and 114 connected in shunt to the resistors 108 and 110 respectively. Resistors 116 and 118 pass potentials to grid electrodes 120 and 122 respectively of a triode pair 124 in the amplifiers 92, while protecting the circuits from excessive grid currents. A suitably regulated and filtered direct current supply source illustrated by a battery 126 has its positive terminal connected in parallel to the anodes 128 and 130 of the triode pair 124 through individual anode load resistors 132 and 134 respectively. The negative terminal of the source 126 is connected through a fixed biasing resistor 138 and an adjustable biasing resistor 140 to the common cathode terminal of the triode pair 124. A voltage divider comprising resistors 142 and 144 determines the potential of the junction 146 of the resistors 108 and 110 with reference to the source 126.

The anode load resistors 132 and 134 are connected through protective resistors 148 and 150 respectively to the grid electrodes 152 and 154 of a triode pair 156 which is comprised in the variable phase shifter 94. A control winding 158 of a saturable reactor 160 is connected between the positive terminal of the source 126 and one anode 162 of the triode pair 156. A control winding 164 of a saturable reactor 166 is connected between the positive terminal of the source 126 and the other anode 168 of the triode pair 156. The negative terminal of the source 126 is connected through a fixed biasing resistor 170 and an adjustable biasing resistor 172 to the cathode 174 of the triode pair 156, and through the resistor 170 and an adjustable biasing resistor 176 to the cathode 178.

The alternating current source 100 is connected across the primary winding 180 of a transformer which has two center-tapped secondary windings. One of these secondary windings comprising portions 182 and 184, with center tap 186, is connected across the serial combination of a resistor 188 and an alternating current winding 190 of the saturable reactor 160, which winding 190 serves as a phase determining adjustable inductor. The junction 192 of the resistor 188 and the winding 190 is connected to the grid electrode 194 of the thyratron 96, and the center tap 186 is connected to the cathode 196 of that thyratron and to the anode 214 of thyratron 98. The other secondary winding comprising portions 198 and 200 with center tap 202, is connected across the serial combination of a resistor 204 and an alternating current winding 206 of the saturable reactor 166, which winding 206 serves as a phase determining adjustable inductor. The junction 208 of the resistor 204 and the winding 206 is connected to the grid electrode 210 of the thyratron 98, and the center tap 202 is connected to the cathode 212 of that thyratron and to the cathode 224 of thyratron 96.

The anode 214 of the thyratron 98, the cathode 196 of the thyratron 98 and the common terminal 186 are connected over leads 216 and 218 to one terminal of the alternating current power source 100, the other terminal of which source is connected over a lead 219, the rectifier bridge 58, motor armature 52, motor field winding 54, (FIG. 1) or motor field winding 55 (FIG. 5), as the case may be, and leads 220 and 222 to the anode 224 of the thyratron 96 and the cathode 212 of the thyratron 98 and by way of the lead 223 to the common terminal 202.

By suitable attention to the poling of the transformer winding 180, 182, 184, and 198 and 200 the grid 152 of the triode pair 156 may be made to control the thyratron 96 while at the same time the grid 154 may be made to control the thyratron 98. In FIG. 2, each of these transformer windings is marked with a dot at one end, according to a commonly employed convention which means that the phase of the voltage at the dotted end of each winding at any given instant is the same in all the windings. In FIG. 2, the windings are so poled as to effect the above mentioned control of the respective thyratrons by the grids of the triode pair 156.

In particular, the proper phasing of the components of the system shown in FIGS. 1 and 2 may be arrived at as follows: It is desired that the slave carriage 48 shall be driven always in the same direction as the master carriage 28 is driven. Assume that the master carriage 28 is being driven to the right and that current in the downward direction in the series field winding 54 as illustrated in FIG. 1 or in the shunt field winding 55 as illustrated in FIG. 5, causes the armature 52 to turn in such direction as to drive the slave carriage 48 also to the right.

With the master carriage leading the slave carriage, the armature 70 will be to the right of center, as in FIG. 4 and sensor 80 will intercept more magnetic flux than will sensor 78. Accordingly, in the amplifier 92, grid 122 is positive and grid 120 is negative. This unbalances the amplifier, lowering the potential of anode 130 and raising the potential of anode 128. Consequently, in amplifier 94, the potential goes down at grid 154 and up at grid 152. This blocks current through control winding 164 and permits current in control winding 158, resulting in high inductance in power winding 206 and adjustable inductance in power winding 190.

It will be noted from FIG. 2 that in order to have downward current in field winding 54 (or 55) the thyratron 96 must be made conductive and the thyratron 98 should be blocked. Thyratron 96 is conductive when its grid 194 and anode 224 differ in phase by less than 180°, and thyratron 98 is blocked when its grid 210 and anode 214 are substantially out of phase.

Due to the low inductance in winding 190, the grid 194 is at substantially the potential of the right-hand end of the center-tapped winding 182, 184. It will be assumed that this potential is relatively negative, as indicated in FIG. 2 by the fact that the left-hand end of this winding is dotted and and the right-hand end is undotted. The anode 224 must then be connected to the negative end of the winding 180. This connection is made in FIGS. 1 and 2 by way of leads 222, 220 field winding 54, bridge 58 and lead 219 to the left-hand end of the winding 180. Accordingly, it is necessary to pole the winding 180 in such manner that the left-hand end of the winding 180 is relatively negative. Therefore, in FIG. 2 the left-hand end of winding 180 is shown undotted and the right-hand end is shown dotted. The corresponding connection in FIG. 5 is by way of lead 220, field winding 55 and bridge 58 in parallel, and lead 219, with the same result as regards the polarity required in the winding 180.

There is thus shown and described herein advantageous circuits for controlling both the speed and the direction of rotation of a direct current motor by means of a control current of adjustable amplitude and reversible direction without any make-and-break contactors.

The tachometer generator 68 is connected over leads 224 and 226 and a differentiating capacitor 228 to the terminals of a rate adjusting potentiometer 230 in serial connection with the protective resistor 118.

The tachometer generator generates a unidirectional electromotive force approximately proportional to the speed of the motor rotor 52. As long as the motor speed is constant the tachometer rotor 68 produces no effect in the coupling rheostat 230. Any change in speed, however, causes a current proportional to the rate of change of speed to be transmitted to the rheostat 230 through the capacitor 228, the direction of the pulse through the rheostat depending upon whether the speed increases or decreases.

In order to provide a damping effect upon the servosystem for the purpose of reducing hunting, the polarity of the connection of leads 224 and 226 is made such as to oppose the effect of the E-transformer in calling for a change of speed. For example, when the E-transformer is calling for higher speed and the rotor 52 suddenly speeds up in response to this call, the potential impressed upon the rheostat 230 by the tachometer generator is made to oppose the potential impressed upon the grid electrode 122 by the phase discriminator 90 in order to slow down the change of speed which will result. Similarly, when the E-transformer is calling for lower speed and the rotor accordingly suddenly slows down, the potential impressed upon the rheostat 230 by the tachometer generator again is made such as to oppose the change in potential impressed upon the grid electrode 122. The effect in each case is to introduce damping into the servosystem.

It will be evident that the positions of the armature 52 and the field winding 54 (or 55) of the slave motor may be interchanged if desired. However, it will generally be more advantageous to use the arrangement shown in FIG. 2. This is because the material inductance of the field winding as compared to the negligible inductance of the armature will tend to slow the response of the rectifier bridge 58 to changes in current if placed in the position where the armature 52 is now shown.

Figure 6:
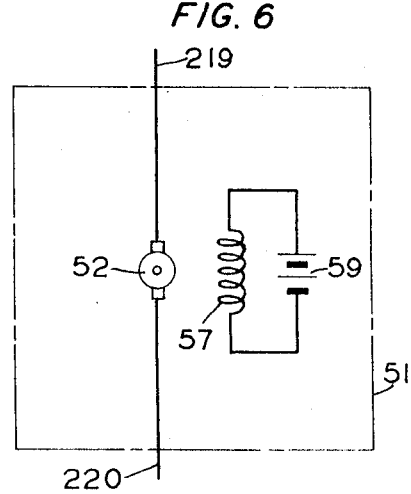
FIG. 6 is another fragmentary schematic diagram showing the substitution of a separately excited motor for a series or shunt wound motor in the same portion of FIG. 1.
Figure 7:
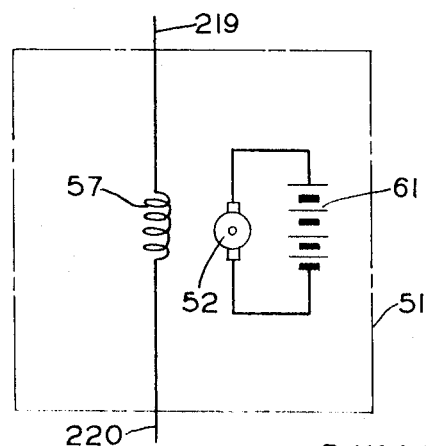
FIG. 7 is a fragmentary schematic diagram showing a variation of the arrangement of FIG. 6.

The field winding for the motor armature 52 may also be separately excited instead of series or shunt excited. The connections then are as shown either in FIG. 6 or in FIG. 7, as desired. In the arrangement shown in FIG. 6, there is shown a field winding 57 excited by any suitable source of direct current, represented as a battery 59. The armature current is fed directly to the armature 52 without the interposition of any effectively one-way circuit such as the bridge 58. The control current to drive the motor in one direction is fed in over lead 219 and out over lead 220. For the other direction of motor rotation, the control current is fed in over lead 220 and out over lead 219. In the arrangement shown in FIG. 7, the relative positions of the armature 52 and the field winding 57 are interchanged. In this case, the armature current is shown as supplied by a battery 61 which may be of different voltage than the battery 59, and the control current is fed through the field winding 55 in either direction as required.

It should be noted that the motor for moving the carriage 28 need not be series wound, as shown in FIG. 1, but may be shunt wound, or may be separately excited, it being necessary only to provide modified circuit arrangements (not shown) in known manner for effecting reversal of the direction of rotation of the motor.

FIGS. 8 and 9 show part of a servosystem alternative to corresponding portions shown in FIGS. 1 and 2, and employing solid-state components instead of thermionic tubes. The circuits of FIGS. 8 and 9 begin with the resistors 108 and 110 of FIG. 2, replacing the remaining portion of FIG. 2 to the right of the resistors 108, 110, and incorporating the motor 52, 54, full-wave rectifier bridge 58 and tachometer generator 68 of FIG. 1. The outer terminals of the resistors 108 and 110 are designated 323 and 324 respectively in FIG. 8.

The functions of the amplifier 92 of FIG. 2 are performed by N-channel field-effect transistors 301, 302, NPN-type transistors 303, 304 and associated circuits. The transistors 301, 302 operate as source followers which in turn vary the conductances of the transistor 303 or 304 in opposite senses.

The functions of the variable phase shifter 94 are performed by NPN-type transistors 305 and 306 and associated circuits. When the transistor 303 is least conductive there is no material voltage drop through the load resistor 132 so there is a relatively high base voltage on the transistor 305, rendering the latter transistor highly conductive and sending maximum current through the control winding 164. On the other hand, when the transistor 304 is least conductive, there is no material voltage drop through the load resistor 134 so there is a relatively high base voltage on the transistor 306, rendering the latter transistor highly conductive and sending maximum current through the control winding 158.

Each of the N-channel field-effect transistors 301, 302 has a source electrode S, a drain electrode D and a gate electrode G, as indicated in FIG. 8. Current in the conventional sense enters the transistor at S and leaves at D, and the conductance of the transistor is determined by the potential upon the gate electrode G. In the balanced state of the system, the gates of the transistors 301 and 302 are at the same potential and equal currents pass through the two transistors. Due to the symmetry of the circuit arrangement, when the gates G are at the same potential, equal current pass through the two transistors 303, 304, and equal potentials are impressed upon the respective base electrodes of the transistors 305, 306. The potentials on the base electrodes of the transistors 305, 306 in the balanced condition are adjusted so that the latter transistors are at substantially cutoff condition. When the potentials, at terminals 323, 324 become unequal, the current through one of the transistors 303, 304 increases while the current through the other transistor decreases. As a result, the potential on the base electrode of one of the transistors 305, 306 goes more positive while the potential on the base electrode of the other of these transistors goes more negative. The transistor, 305 or 306, whose base goes more negative remains cut off, while the transistor whose base goes more positive becomes conductive and passes a variable amount of current the amplitude of which depends upon the amount of potential on its base. As in the case of the system of FIG. 2, one of the alternating current windings 190 or 206 is maintained at maximum inductance whereas the other alternating current winding assumes an inductance value that is controlled by the current in the respective control winding 158 or 164.

As in the case of the thyratron circuits shown in FIGS. 1 and 2, suitable control voltages are developed at the points 192 and 208. These control voltages, however, occur in high impedance circuits, which are a good impedance match for the control grid circuits of the thyratrons. On the other hand, the solid-state equivalents for the thyratrons, which may be silicon controlled rectifiers 307, 308 have relatively low impedance control circuits. To make the impedance transition, a pair of NPN-type transistors 309, 310, are provided. The control point 192 is connected through a diode 311 and a resistor 351 to the base terminal of the transistor 310 and the control point 208 is connected to the base terminal of the transistor 309 through a diode 312 and a resistor 350. The emitter terminals of the transistors 309 and 310 are connected to the control electrodes of the respective rectifiers 307 and 308.

As in the arrangements shown in FIGS. 1 and 2, current to drive the motor armature 52 is conducted through one or the other of the unidirectional conductors, here the silicon controlled rectifiers 307, 308, through the bridge 58 and armature 52, and through the field winding 54.

Direct current for the transistors shown in FIG. 8 is supplied from sources, preferably voltage regulated, which are represented by batteries 313 and 314.

A dead-zone adjusting circuit is provided, using a battery 315, a potentiometer 316 and a series resistor 317. The movable arm of the potentiometer 316 is connected to the junction between the resistor 108 and 110.

Collector currents for the transistors 309 and 310 shown in FIG. 9 are derived respectively from the winding 198, 200 by way of a rectifying diode 353 and from winding 182, 184 by way of a rectifying diode 354.

A booster winding 183, coupled to the primary winding 180 may be inserted as shown between the source 100 and the motor elements 52, 54, to increase the voltage impressed upon these elements by the source 100. In this way, it is possible to make up for the loss of voltage applied to the motor elements that results from the utilization of half-wave rectifiers 307 and 308 for purposes of controlling the direction of rotation of the motor:

FIG. 10 shows how the circuits shown in FIGS. 8 and 9 can be used in a velocity servosystem. This is in distinction to the use of the circuits of FIGS. 8 and 9 or of the circuits of FIGS. 1 and 2 in a position servosystem.

A potentiometer 320 is provided, the movable arm of which is connected through a a resistor 322 to terminal 324. Connected across the potentiometer 320 there are provided regulated voltage sources 325 and 326, represented as batteries, preferably of equal voltages, and connected in series aiding relationship. The junction point of the sources 325 and 326 is connected to terminal 323. The terminal 323 is connected to the end of resistor 108 remote from the common junction of resistors 108 and the terminal 324 is connected to the end of the resistor 310 remote from the common junction.

The tachometer generator 68 driven by the armature 52, is connected across the terminals of the resistor 322 in series with the parallel combination of a resistor 326 and a capacitor 327.

The circuit of FIG. 10 can be used to control the circuits of FIGS. 8 and 9 in the usual manner of a velocity servosystem. The tachometer generator 68 develops a voltage across the resistor 322 substantially proportional to the speed of the motor. The voltage of the generator 68 is opposed to the selected voltage at the movable arm of the potentiometer 320, leaving a small net potential difference between the terminals 323 and 324. The potentiometer 320 can be calibrated in terms of motor speed, forward and reverse. To select a desired speed and direction of rotation of the motor, the operator sets the movable arm of the potentiometer 320 at the desired indication. At any setting other than zero speed, the setting of the potentiometer arm causes an unbalance between the potentials of the terminals 323 and 324. The motor immediately speeds up, thereby turning the tachometer and cutting down the net potential difference of the terminals 323 and 324. This process continues until the remaining potential difference is just sufficient to maintain the motor speed. At this point equilibrium is established, approximately at the speed indicated by the setting of the calibrated potentiometer 320. Zero speed setting is approximately midway of the potentiometer.

The movable elements which are to be maintained in substantially constant relative position have been shown herein as welding tools on opposite sides of a plate or plates to be welded. It will be understood, however, that other types of tools or elements may be substituted for welding tools and that the elements may be separated by any sort of obstruction, platelike or otherwise. In particular, the obstruction may be of such type that the elements are substantially inaccessible to mechanical interconnection.

While illustrative forms of apparatus and methods in accordance with the invention have been described and shown herein, it will be understood that numerous changes may be made without departing from the general principles and scope of the invention.

I claim:

1. Apparatus for moving in synchronism and maintaining a substantially constant relative position between two movable tools located respectively, on opposite sides of platelike work, a master motor for moving one tool across the work in a preferred manner, a slave motor for moving the other tool in synchronized relation thereto across the opposite side of the work, means movable along with one tool for generating an alternating magnetic field in sufficient strength for projecting a field pattern transversely through the platelike work, means movable along with the other tool for modifying the pattern of the projected field in accordance with relative displacement of the tools from a desired relative position, means for sensing the magnitude and directional change of the modified field pattern, and servo means responsive to the sensing means for controlling the speed and drive direction of the slave motor for maintaining the desired relative position of the movable tools.

2. Apparatus according to claim 1 in which the means for generating the magnetic field constitutes a transformer having a primary winding and two secondary sensing windings, the latter being spaced for producing the magnetic field pattern projected through the work, and the modifying means constitutes a member having uniformly high magnetic permeability that is in approximate spanning relation to the secondary windings when the tools are in the constant relative position whereby the respective sensing winding voltages are varied according to the degree and direction of displacement of the movable tools.

3. Apparatus in accordance with claim 1, in which the work material has low magnetic permeability for facilitating projection of the alternating magnetic field generated on one side of said work through said material sufficiently to be materially modified by said field pattern modifying means when the said modifying means is located on the opposite side of said work from the side on which the said field is generated.

4. Apparatus according to claim 1, in which the said means for sensing a modification in said field pattern is located on the same side of said work as the said means for generating the said alternating magnetic field.

5. Apparatus for synchronizing the motions of first and second movable tools that are substantially inaccessible to mechanical interconnection at opposite sides respectively of a large workpiece, comprising, in combination, an E-transformer having a core and windings, a first carriage at one side of the workpiece upon which are mounted said E-transofmre and one of said tools, an armature for said E-transformer, a second carriage at the other side of the workpiece upon which are mounted said armature and the other of said tools, means including an energizing winding for said E-transformer for generating an alternating magnetic field emanating from said core for projecting transversely through the work and permeating said armature, sensing means including a pair of windings of said E-transformer for detecting changes in the field pattern of the projected magnetic field due to relative displacement of said core and said armature, means for driving one of said carriages with a desired motion, means for driving the other said carriage with a controllable variable motion substantially parallel to the motion of said first carriage, and servo means responsive to said sensing means for controlling the said motion of said second carriage, whereby the desired relative position of said tools is substantially maintained during motion of said carriages.

6. The method of moving in synchronism and maintaining a substantially transverse alignment between two motor driven welding tools located respectively, on opposite sides of platelike work to be welded, one tool being movable independently across the work at a preferred drive rate, the other tool to be moved at the opposite side of and across the work in synchronized relation to the independently movable tool, the method comprising:

a. generating a magnetic field in fixed spatial relation to one of the tools in sufficient strength for projecting a field pattern transversely through the platelike work, b. modifying the pattern of the projected field according to relative displacement between the field and a region of uniformly high magnetic permeability that is in fixed spatial relation to the other tool and adjacent to the corresponding side of the work, c. sensing the magnitude and directional change of the modified field pattern, d. and controlling the motor speed and direction of the synchronized tool according to the sensed field changes whereby the welding tools are operated substantially in synchronism and transverse alignment.

UNITED STATES PATENT OFFICE
CERTIFICATE OF CORRECTION

Patent No. 3,588,660        Dated June 28, 1971

Inventor(s) Rawlins E. Purkhiser

It is certified that error appears in the above-identified patent and that said Letters Patent are hereby corrected as shown below:

Column 3, line 30, "rotor" should be --motor--
Column 4, line 60, "that" (first instance) should be --through--
Column 4, line 71 "release" should be --else--
Column 6, line 19 "cathode" (second instance) should be --anode--
Column 6, line 22, "98" should be --96--
Column 10, line 57, "E-transofmre" should be --E-transformer--

Signed and sealed this 28th day of December 1971.

(SEAL)
Attest:

EDWARD M. FLETCHER, JR.
Attesting Officer

ROBERT GOTTSCHALK
Acting Commissioner of Patents